United States Patent
Greiner et al.

(10) Patent No.: US 10,961,032 B2
(45) Date of Patent: Mar. 30, 2021

(54) STRIP SEAL FOR SQUARE SHAPE WITH SHARP CORNERS

(71) Applicant: Hanon Systems, Daejeon (KR)

(72) Inventors: Angela Greiner, Plymouth, MI (US); James Bennett, Livonia, MI (US); Megan Stabile, Livonia, MI (US)

(73) Assignee: HANON SYSTEMS, Daejeon (KR)

(*) Notice: Subject to any disclaimer, the term of this patent is extended or adjusted under 35 U.S.C. 154(b) by 0 days.

(21) Appl. No.: 16/382,292

(22) Filed: Apr. 12, 2019

(65) Prior Publication Data
US 2020/0324948 A1 Oct. 15, 2020

(51) Int. Cl.
*B65D 53/06* (2006.01)
*B65D 53/02* (2006.01)

(52) U.S. Cl.
CPC ............ *B65D 53/02* (2013.01); *B65D 53/06* (2013.01); *B65D 2251/0093* (2013.01)

(58) Field of Classification Search
CPC . B65D 53/02; B65D 53/06; B65D 2251/0093
USPC ...................................... 428/542.8
See application file for complete search history.

(56) References Cited

U.S. PATENT DOCUMENTS

2015/0246758 A1* 9/2015 Benigni ............... B65D 45/322
220/315

FOREIGN PATENT DOCUMENTS

JP H0747762 Y2 11/1995
NL 1039986 C2 * 7/2014

OTHER PUBLICATIONS

Pikkemaat, NL1039986 C2 machine translation, Jul. 8 2014, entire translation (Year: 2014).*

* cited by examiner

*Primary Examiner* — Humera N. Sheikh
*Assistant Examiner* — Katherine A Christy
(74) *Attorney, Agent, or Firm* — Shumaker, Loop & Kendrick, LLP; James D. Miller

(57) ABSTRACT

A sealing element having a substantially right-angled exterior corner is formed from a preform. The preform is formed from a strip of sealing material including a first longitudinal side surface having a projection projecting therefrom and an oppositely arranged second longitudinal side surface having a notch formed therein. The notch is aligned with the projection with respect to the longitudinal direction of the strip. A first segment of the strip is formed to a first side of the projection and a second segment of the strip is formed to a second side of the projection. The projection forms the substantially right-angled exterior corner of the sealing element following a bending of the first segment perpendicular to the second segment.

12 Claims, 4 Drawing Sheets

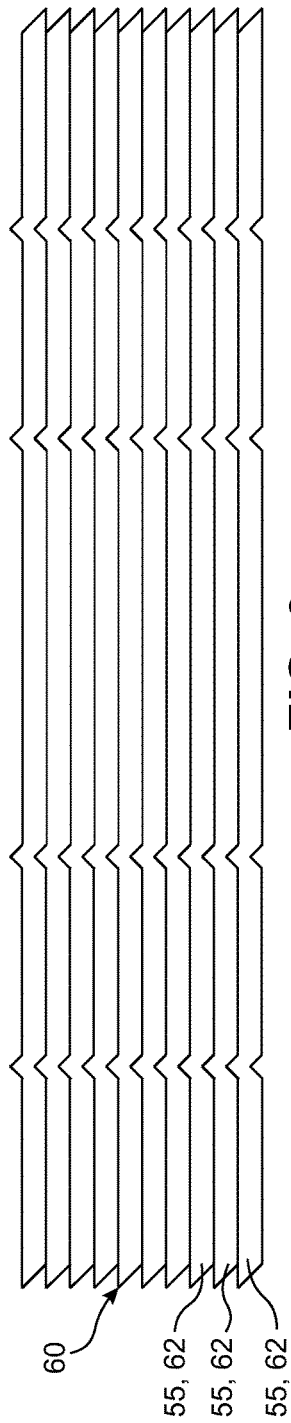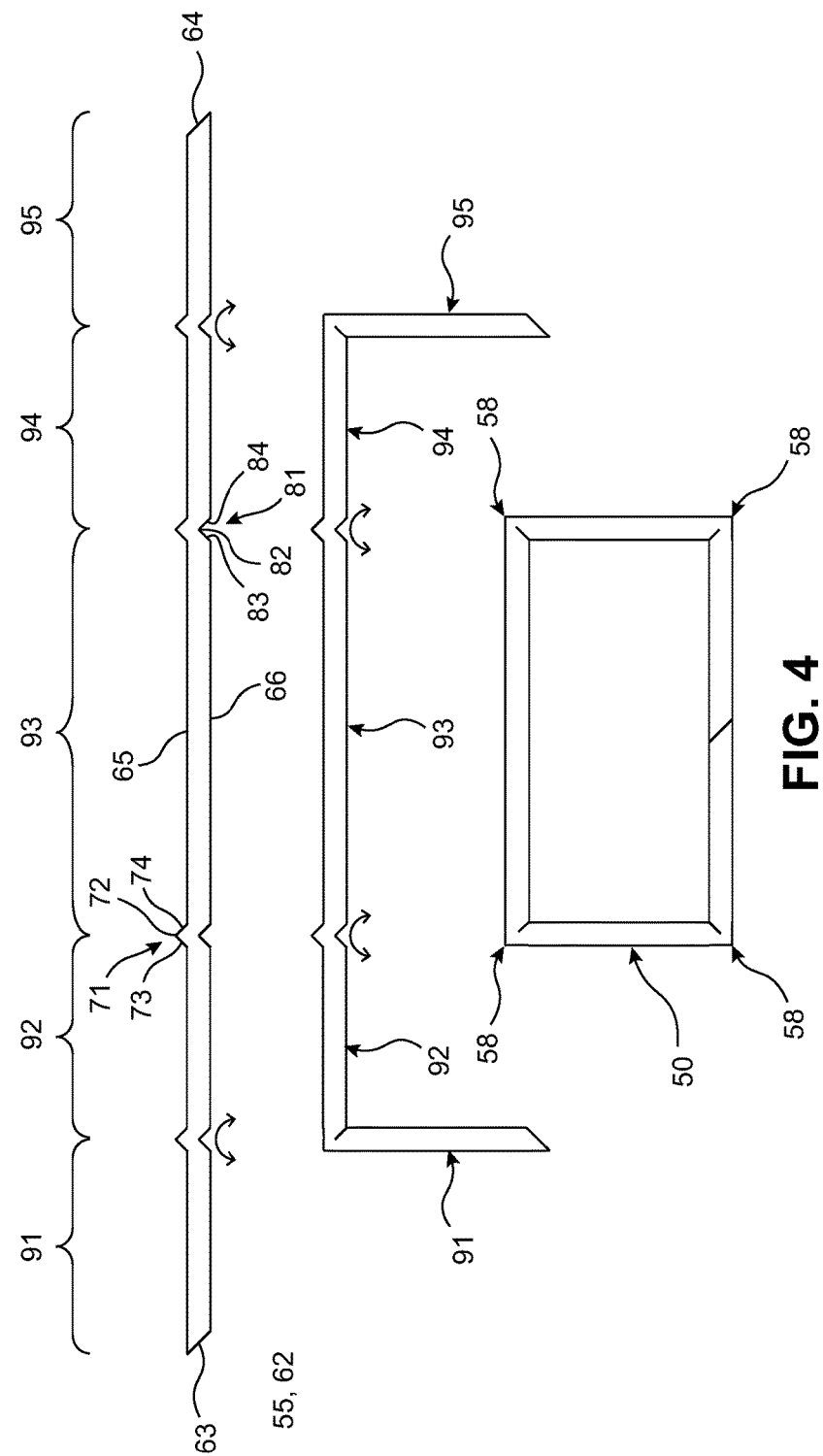

US 10,961,032 B2

STRIP SEAL FOR SQUARE SHAPE WITH SHARP CORNERS

FIELD OF THE INVENTION

The invention relates to a sealing element, and more particularly, to a sealing element for sealing a rectangular shape with right-angled exterior corners.

BACKGROUND OF THE INVENTION

It is common for a sealing element to be present at the junction of two components defining a fluid flow path therethrough. The sealing element may, for example, be placed between the sealing surfaces of two components cooperating to form a fluid flow path through a housing of an air conditioning system of a motor vehicle.

In some circumstances, it may be necessary for the sealing element to engage an entirety of a sealing surface including both right-angled interior corners and right-angled exterior corners, such as a sealing surface formed into a substantially rectangular peripheral shape. For example, the sealing surface may be formed by a substantially rectangular rim or ledge surrounding a rectangular opening formed through a housing of the air conditioning system.

Traditionally, such sealing elements may be produced from an elongate strip of sealing material that is subsequently bent or folded into the prescribed perimeter shape of the corresponding sealing surface that the sealing element in configured to engage. However, it has been discovered that such strips of sealing material often fail to engage an entirety of the corresponding sealing surface when the sealing surface includes the aforementioned right-angled interior corners and right-angled exterior corners. The surface tension present within the sealing material tends to cause the sealing element to be stretched at each of the corners thereof during the bending or folding of the strip of sealing material. The stretching of the sealing material at each of the exterior corners of the sealing element results in each of the external corners having a substantially arcuate or radiused shape.

The tendency for the folded sealing element to form this tensioned curvature accordingly results in the sealing element undesirably failing to engage the entirety of the corresponding sealing surface, thereby presenting a potential weakness in the seal formed by the sealing element.

It would therefore be desirable to produce an easily manufactured sealing element capable of covering an entirety of a seal engaging surface having both right-angled interior corners and right-angled exterior corners.

SUMMARY OF THE INVENTION

Compatible and attuned with the present invention, an improved sealing element suitable for engaging a seal engaging surface having a right angled exterior corner has surprisingly been discovered.

In one embodiment of the invention, a sealing element having a substantially right-angled exterior corner is formed from a preform. The preform is formed from a strip of sealing material including a first longitudinal side surface having a projection projecting therefrom and an oppositely arranged second longitudinal side surface having a notch formed therein. The notch is aligned with the projection with respect to the longitudinal direction of the strip. A first segment of the strip is formed to a first side of the projection and a second segment of the strip is formed to a second side of the projection. The projection forms the substantially right-angled exterior corner of the sealing element following a bending of the first segment perpendicular to the second segment.

A method of manufacturing a sealing element is also disclosed. The method comprises the steps of: providing a sheet of sealing material and cutting a strip of the sealing material from the sheet of sealing material. The strip includes a first longitudinal side surface having a projection projecting therefrom and an oppositely arranged second longitudinal side surface having a notch formed therein. The notch is aligned with the projection with respect to the longitudinal direction of the strip.

A method of manufacturing a plurality of sealing elements is also disclosed. The method comprises the steps of: providing a sheet of sealing material and cutting a plurality of strips of the sealing material from the sheet of sealing material. Each of the strips includes a first longitudinal side surface having a projection projecting therefrom and an oppositely arranged second longitudinal side surface having a notch formed therein. A cut defining the first longitudinal side surface and the projection of each of the strips also defines the second longitudinal side surface and the notch of an adjacent one of the strips. The notch and the projection of each of the strips are aligned with respect to the longitudinal direction of each of the strips.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings:

FIG. 3 is a top plan view of a sheet of sealing material used to form a preform of the sealing element;

FIG. 4 is a top plan view illustrating a method of forming the sealing element from the preform;

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-4 illustrate a sealing element 50 and a method of manufacturing the same according to an embodiment of the invention. The sealing element 50 is suitable for engaging each of a first seal engaging surface of a first component and a second seal engaging surface of a second component, wherein the first component and the second component are configured to cooperate to define a fluid flow path in need of sealing by the sealing element 50. The fluid flow path may be a flow path through an air conditioning system of a motor vehicle, as one non-limiting example.

Figure 1:
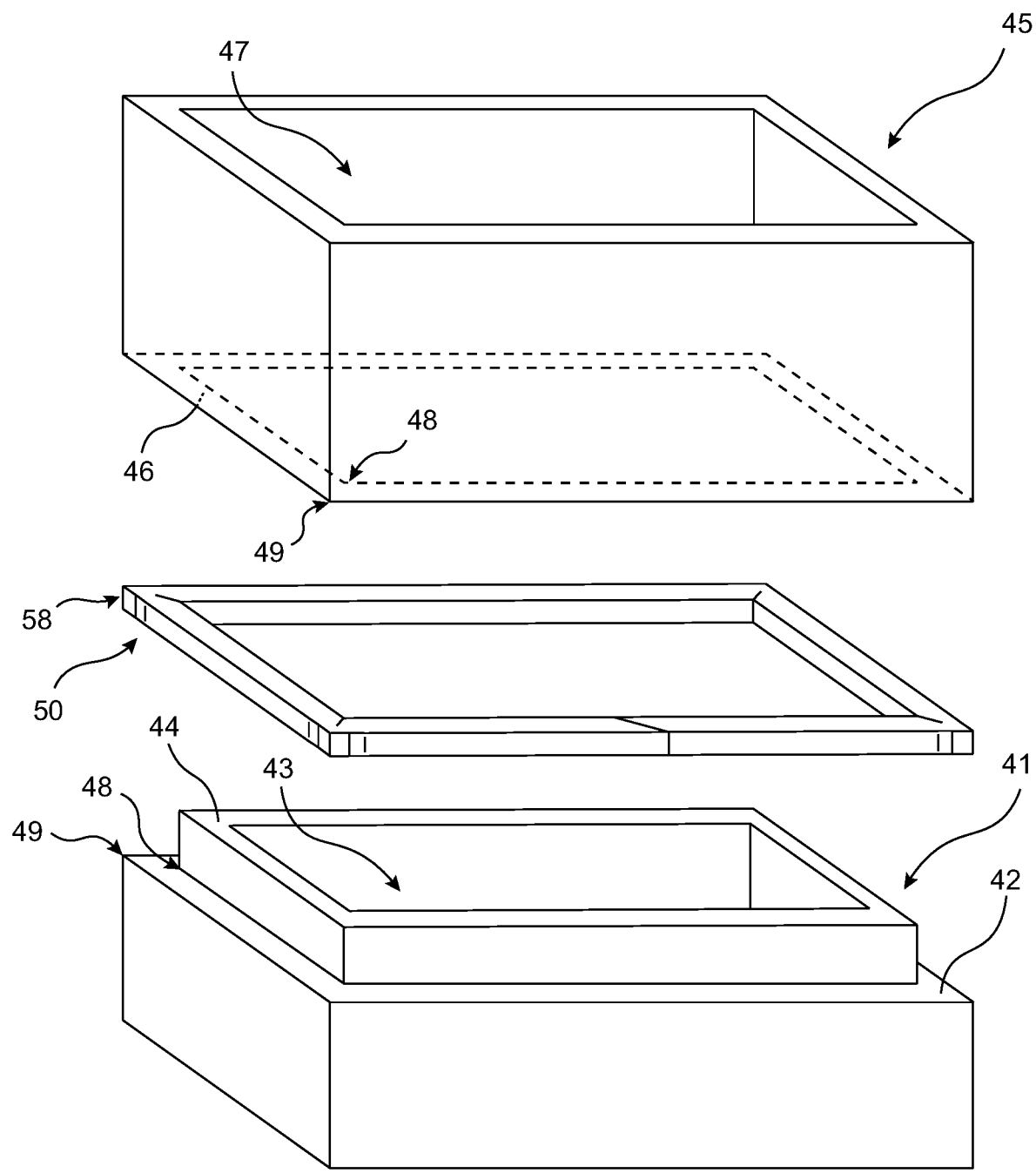
FIG. 1 is an exploded perspective view of a seal assembly including a sealing element according to the present invention.
Figure 2:
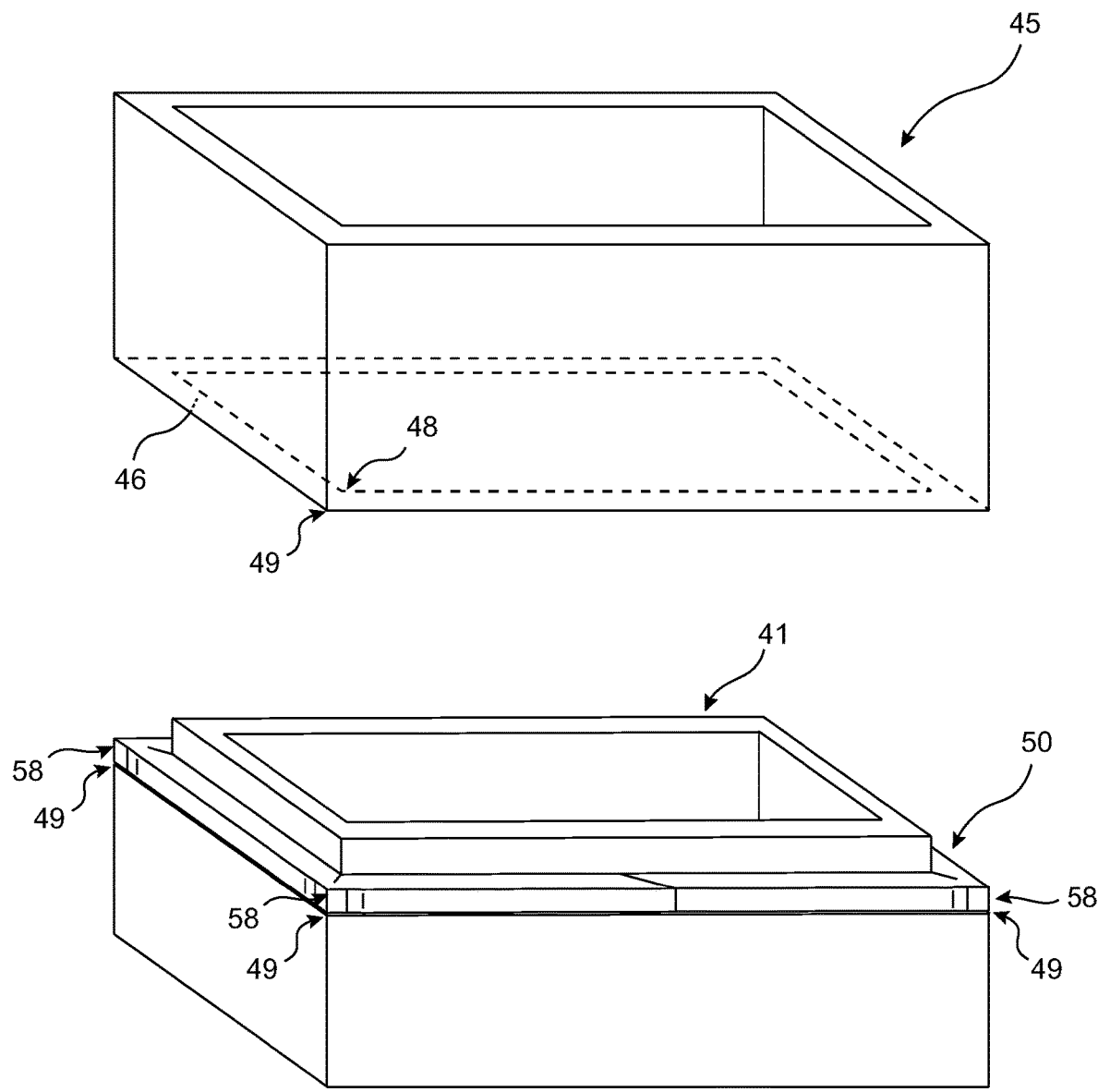
FIG. 2 is a partially exploded perspective view of the sealing element of FIG. 1 disposed on a seal engaging surface of the seal assembly.

For example, FIGS. 1 and 2 illustrate a first housing structure 41 including a first seal engaging surface 42 and a second housing structure 45 including a second seal engaging surface 46. Each of the illustrated seal engaging surfaces 42, 46 includes a shape resembling that of a rectangular frame having four right-angled interior corners 48 and four right-angled exterior corners 49. It should be understood that the phrase "interior corner" refers to a corner wherein the cooperating surfaces or edges forming the corner form a substantially concave surface arrangement while the phrase "exterior corner" refers to a corner wherein the cooperating surfaces or edges forming the corner form a substantially convex surface arrangement. As used herein, "substantially" is defined as "to a considerable degree" or "proximate" or as otherwise understood by one ordinarily skilled in the art. If, for some reason, the imprecision provided by "substantially" is not otherwise understood in the art with this ordinary meaning, then "substantially" as used herein indicates at least variations that may arise from ordinary methods of measuring or using such parameters.

The first housing structure 41 is illustrated as including a first opening 43 having a substantially rectangular cross-sectional shape surrounded by a substantially rectangular rim 44, wherein the first seal engaging surface 42 forms a ledge surrounding an outer circumferential surface of the rim 44. The second housing structure 45 includes a second opening 47 having a substantially rectangular cross-sectional shape with the second seal engaging surface 46 surrounding the second opening 47. The second seal engaging surface 46 may include substantially the same size and shape as the first seal engaging surface 42, including having four right-angled interior corners 48 and four right-angled exterior corners 49. The second opening 47 may be dimensioned to receive the rim 44 of the first housing structure 41 therein when the first seal engaging surface 42 and the second seal engaging surface 46 are moved towards each other in a direction of compression of the sealing element 50, as desired. The first opening 43 and the second opening 47 cooperate to form a fluid flow path through a combined housing formed by the cooperation of the first housing structure 41 and the second housing structure 45. The sealing element 50 is accordingly configured for placement between the first seal engaging surface 42 and the second seal engaging surface 46 for sealing the fluid flow path defined by the cooperating housing structures 41, 42.

The sealing element 50 may be formed from a single material or the sealing element 50 may be produced from a laminated structure of two or more materials, as desired. For example, the sealing element 50 may be formed from a single polymeric sealing material or the sealing element 50 may include a layer of the polymeric sealing material and at least one additional layer of an adhesive for securing a position of the sealing element 50 relative to a corresponding seal engaging surface. If an adhesive layer is used, the sealing element 50 may additionally include a layer of a removable backing material for selectively exposing the adhesive when coupling the sealing element 50 to the corresponding seal engaging surface, and potentially an additional base layer (not shown) suitable for receiving the adhesive thereon and coupling to the layer of the sealing material. Regardless of the number of layers used to form the sealing element 50, it should be understood that the primary layer of the polymeric sealing material forms a majority of the sealing element 50 such that the inclusion of any additional adhesive or backing layers do not significantly alter the essential characteristics of the present invention.

The polymeric material forming the sealing element 50 may be any suitable polymeric material having the requisite characteristics for elastically and resiliently deforming when compressed between the corresponding sealing surfaces 42, 46. The polymeric material may be a thermoplastic material, an elastomer, or co-polymers thereof, as non-limiting examples. The polymeric material may be formed into a foam structure including a desired degree of porosity and elasticity. If the foam structure is used, the foam may be formed from ethylene propylene diene monomer (EPDM) rubber or polyurethane, as non-limiting examples. The polymeric material may be a composite material including both a polymeric material and at least one filler material, as desired. One skilled in the art should appreciate that the concepts disclosed herein are applicable to a variety of different elastic sealing materials typically undergoing surface tension when elastically deformed in a folding or bending process as disclosed herein.

As shown in FIGS. 3 and 4, the sealing element 50 may be cut or otherwise removed from a sheet 60 of one of the materials or laminates described above. Hereinafter, for the sake of simplicity and clarity, it will be assumed that the sheet 60 is formed from a single sealing material in the absence of any additional layers such as the aforementioned adhesive layer or backing layer.

The sheet 60 includes a substantially constant height dimension throughout, wherein the height dimension extends in the direction of compression of the sealing element 50 when compressed between the first and second housing structures 41, 45. The removal of the sealing element 50 from the sheet 60 may include cutting or otherwise shearing a desired perimeter shape of a preform 55 of the sealing element 50 from the sheet 60 to cause the preform 55 to include a substantially constant height throughout in similar fashion to the sheet 60. The cutting or shearing of the sheet 60 may be performed perpendicular to the plane of the sheet 60 to result in the preform 55 including a circumferential surface arranged parallel to the height direction of the preform 55. The preform 55 may for example be removed from the sheet 60 in a die cutting process, as desired.

Following the cutting process, the preform 55 is presented as an elongate strip 62 of the sealing material or laminated sealing structure. The circumferential surface of the strip 62 includes a first end surface 63, a second end surface 64 arranged opposite the first end surface 63, a first side surface 65 connecting the first end surface 63 to the second end surface 64, and a second side surface 66 arranged opposite the first side surface 65 and also connecting the first end surface 63 to the second end surface 64. The first side surface 65 and the second side surface 66 extend substantially parallel to each other in a longitudinal direction of the strip 62. A width direction of the strip 62 is arranged perpendicular to each of the longitudinal direction and the height direction thereof and extends between the first side surface 65 and the second side surface 66.

As shown in FIG. 4, the first side surface 65 of the strip 62 includes a plurality of longitudinally spaced projections 71 while the second side surface 66 of the strip 62 includes a plurality of longitudinally spaced notches 81, wherein each of the projections 71 is aligned with a corresponding one of the notches 81 with respect to the longitudinal direction of the strip 62.

Each of the projections 71 forms a convex surface having a substantially triangular cross-sectional shape as taken through a plane extending in the width and longitudinal directions of the strip 62. More specifically, each of the projections 71 is formed by the cooperation of a first angled surface 73 arranged at a right angle with respect to an oppositely arranged second angled surface 74, resulting in each of the angled surfaces 73, 74 being inclined at 45 degrees with respect to the longitudinal direction of the strip 62. The angled surfaces 73, 74 meet at a pointed tip 72 of each of the projections pointing in the width direction of the strip 62. The pointed tip 72 may be spaced from a surrounding portion of the first side surface 65 by about half the width dimension of the strip 62 as measured between the first and second side surfaces 65, 66.

Each of the notches 81 forms a concave surface having a substantially triangular cross-sectional shape as taken through a plane extending in the width and longitudinal directions of the strip 62. More specifically, each of the notches 81 is formed by the cooperation of a first angled surface 83 arranged at a right angle with respect to an oppositely arranged second angled surface 84, resulting in each of the angled surfaces 83, 84 being inclined at 45 degrees with respect to the longitudinal direction of the strip 62. A pointed tip 82 of each of the notches 81 points in the width direction of the strip 62 and is positioned in alignment with the pointing direction of a corresponding one of the projections 71. The pointed tip 82 of each of the notches 81 may be spaced from a surrounding portion of the second side surface 66 by about half the width dimension of the strip 62.

The first angled surface 73 of each of the projections 71 is arranged parallel to and in longitudinal alignment with a corresponding first angled surface 83 of one of the notches 81 while the second angled surface 74 of each of the projections 71 is arranged parallel to and in longitudinal alignment with a corresponding second angled surface 84 of one of the notches 81.

Each of the first end surface 63 and the second end surface 64 is shown as an angled surface arranged about 45 degrees with respect to the longitudinal direction of the strip 62, but it should be understood that any two complimentary shapes may be used at the respective ends of the strip 62 to form a continuous sealing element 50 at the junction between the first end surface 63 and the second end surface 64 when the strip 62 is formed into the final shape of the sealing element 50.

The aligned pairs of the projections 71 and notches 81 divide the strip 62 into a plurality of segments configured for folding relative to each other during the formation of the sealing element 50. The illustrated strip 62 includes a centrally located third segment 93, second and fourth segments 92, 94 surrounding the third segment 93, and first and fifth segments 91, 95 surrounding the second and fourth segments 92, 94. The third segment 93 includes a length substantially equal to a combined length of the first and fifth segments 91, 95 while the second segment 92 includes a length substantially equal to a length of the fourth segment 94. In the provided example, the third segment 93 and the combined first and fifth segments 91, 95 have a greater length than the second segment 92 or the fourth segment 94, but it should be understood that the lengths of the different segments 91, 92, 93, 94, 95 may be modified to produce a sealing element 50 having a rectangular shape with any desired dimensions without departing from the scope of the present invention.

With reference to FIG. 4, a method of folding the strip 82 to arrive at the final configuration of the sealing element 50 is disclosed. As shown by the curved arrows adjacent each of the notches 81, the first segment 91 is folded relative to the second segment 92 and the fifth segment 95 is folded relative to the fourth segment 94. The folding of the first and fifth segments 91, 95 results in the first and fifth segments 91, 95 being arranged perpendicular to the second and fourth segments 92, 94. Next, a first combination of the first and second segments 91, 92 and a second combination of the fourth and fifth segment 94, 95 are each folded relative to the third segment 93 until the second and fourth segments 92, 94 are arranged perpendicular to the third segment 93. The first and second end surfaces 63, 64 having corresponding shapes are engaged following the folding of the strip 62 to form a sealing element 50 having an enclosed rectangular shape. It should be understood that the segments 91, 92, 93, 94, 95 may be folded relative to each other in any desired order without necessarily departing from the scope of the present invention.

As can be seen in FIGS. 1, 2, and 4, each 90 degree fold of the strip 62 results in the first angled surface 83 and the second angled surface 84 of each of the notches 81 being placed in abutment with each other. Concurrently, the folding of the strip 62 also results in the first angled surface 73 and the second angled surface 74 of each of the projections 71 being stretched in a manner wherein the pointed tip 72 of each of the projections 71 is brought closer to the pointed tip 82 of the corresponding one of the notches 81. In other words, the folding process at each aligned pair of one of the projections 71 and a corresponding one of the notches 82 includes the sealing material forming the sealing element 50 being compressed in the width direction of the strip 62 while the sealing material forming the first and second angled surfaces 73, 74 of the strip 62 is elongated in the longitudinal direction of the strip 62.

It has been surprisingly discovered that the aforementioned compression and elongation of the sealing material during the folding process results in a sealing element 50 including a substantially right-angled exterior corner 58 corresponding to each of the projections 71 formed in the strip 62 prior to the folding process. Each of the right-angled exterior corners 58 includes the portion of the strip 62 previously defining the first angled surface 73 of each of the projections 71 arranged substantially parallel to an adjacent portion of the strip 62 previously defining the first side surface 65 as well as the portion of the strip 62 previously defining the second angled surface 74 of each of the projections 71 arranged substantially parallel to an adjacent portion of the strip 62 previously defining the first side surface 65.

The formation of each of the right-angled exterior corners 58 following the folding process beneficially results in the sealing element 50 being able to engage an entirety of the first and second seal engaging surfaces 42, 46 of the respective housing structures 41, 45 when placed in compression therebetween. For example, with reference to FIG. 2, it is apparent that the sealing element 50 engages an entirety of the first seal engaging surface 42 when placed in engagement therewith, including each of the exterior corners 58 of the sealing element 50 substantially corresponding in shape to each of the exterior corners forming the first seal engaging surface 42.

As shown in FIG. 3, the alignment of each of the projections 71 with a corresponding one of the notches 81 also results in the ability to cut a plurality of the strips 62 from the sheet 60 in a nested configuration wherein the cut corresponding to one of the projections 71 also corresponds to one of the notches 81 of an adjacent one of the strip 62.

This nested configuration of the projections 71 and the notches 81 beneficially reduces the amount of material wasted during the formation of each of the sealing elements 50 by eliminating any unnecessary voids within an interior portion of the sheet 60. For example, the removal of each of the notches 81 from the sheet 60 in the absence of the formation of a corresponding projection 71 results in the formation of a plurality of triangular voids within the sheet 60, wherein each of the voids represents a portion of the sheet 60 that must be discarded or otherwise repurposed.

The cooperating shapes of the first end surface 63 and the second end surface 64 also allow for the strips 62 to be cut in repeated fashion with respect to a second direction arranged perpendicular to the first direction of stacking, thereby further reducing the amount of material wasted during the cutting process.

The sealing element 50 is shown and described as engaging a sealing surface having a substantially rectangular frame shape including an inner surface having a rectangular shape and an outer surface having a rectangular shape, but it should be apparent to one skilled in the art that the concepts disclosed herein may be adapted for forming a sealing element suitable for engaging any sealing surface having any pattern of right-angled interior corners and right-angled exterior corners, as desired.

Figure 5:
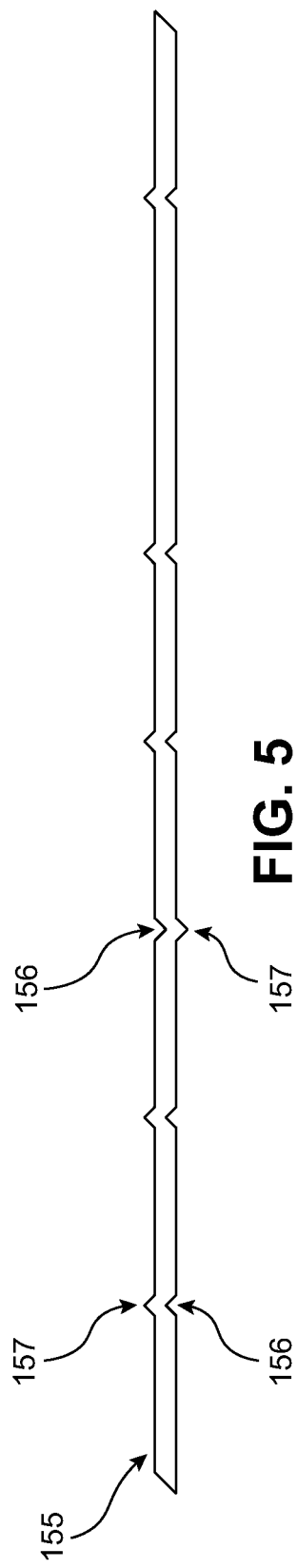
FIG. 5 is a top plan view of a preform used to form a sealing element including both exterior and interior peripheral corners according to another embodiment of the invention.
Figure 6:
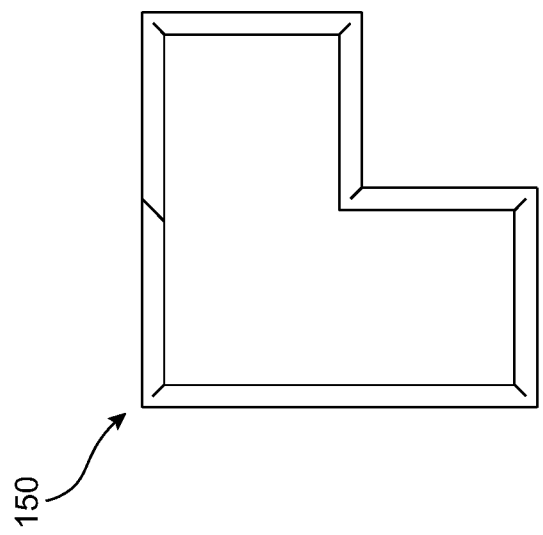
FIG. 6 is a top plan view of the sealing element including both the exterior and the interior peripheral corners.

For example, FIG. 5 illustrates a preform 155 forming a sealing element 150 for engagement with an irregularly shaped seal engaging surface including both interior corners and exterior corners about a periphery thereof. The preform 155 includes longitudinally aligned notches 156 and projections 157 in similar fashion to the preform 55 of FIGS. 1-4, but the notches 156 and the projections 157 are formed on each of the opposing longitudinal sides of the preform 155. The resulting shape of the preform 155 is also capable of being formed into the nested and repeated configuration for cutting from a sheet without unnecessarily wasting interior portions of the sheet. As shown in FIG. 6, the preform 155 may be folded into a substantially L-shaped sealing element 150 including five exterior corners and one interior corner about a periphery thereof. It should be further understood that the notches and the projections may be formed in any pattern on the opposing sides of the corresponding preform and at any desired distances from each other in order to form any desired seal engaging shape having right-angled interior and exterior corners.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A preform for forming a sealing element, the preform comprising:
a strip of sealing material including a first longitudinal side surface having a projection projecting therefrom and a second longitudinal side surface having a notch formed therein, wherein the first longitudinal side surface is arranged opposite the second longitudinal side surface and the notch is aligned with the projection with respect to a longitudinal direction of the strip, wherein the projection is formed by a first angled surface and a second angled surface with the first angled surface of the projection arranged opposite the second angled surface thereof, wherein the notch is formed by a first angled surface and a second angled surface with the first angled surface of the notch arranged opposite the second angled surface thereof, wherein a first segment of the strip is formed to a first side of the projection and a second segment of the strip is formed to a second side of the projection, and wherein the projection forms a right-angled exterior corner of the sealing element and an entirety of the first angled surface and an entirety of the second angled surface of the notch are placed in contact with each other following a bending of the first segment perpendicular to the second segment.

2. The preform of claim 1, wherein the notch and the projection are identical in size and shape.

3. The preform of claim 1, wherein the first angled surface of the projection is arranged perpendicular to the second angled surface of the projection.

4. The preform of claim 1, wherein the first angled surface of the projection is arranged at a 45 degree angle relative to the first longitudinal side surface and wherein the second angled surface of the projection is arranged at a 45 degree angle relative to the first longitudinal side surface.

5. The preform of claim 1, wherein the sealing material is elongated at each of the first angled surface of the projection and the second angled surface of the projection following the bending of the first segment perpendicular to the second segment.

6. The preform of claim 1, wherein the strip is cut from a sheet of the sealing material in a die cutting process.

7. The preform of claim 6, wherein a plurality of the strips is cut from the sheet of the sealing material, wherein a cut defining the first longitudinal side surface and the projection of one of the strips also defines the second longitudinal side surface and the notch of an adjacent one of the strips.

8. The preform of claim 1, wherein the sealing material is a polymeric material.

9. The preform of claim 8, wherein the sealing material is one of an elastomer or a thermoplastic.

10. The preform of claim 8, wherein the sealing material is elastically deformable and porous.

11. The preform of claim 1, wherein the first longitudinal side surface includes a plurality of the projections and the second longitudinal side surface includes a plurality of the notches, wherein each of the projections is aligned with a corresponding one of the notches with respect to the longitudinal direction of the strip.

12. The preform of claim 1, wherein a first edge formed at an intersection of the first angled surface of the notch and the second longitudinal side surface contacts a second edge formed at an intersection of the second angled surface of the notch and the second longitudinal side surface with the first edge contacting the second edge at a right-angled interior corner of the sealing element following the bending of the first segment perpendicular to the second segment.

* * * * *